United States Patent Office 3,438,743
Patented Apr. 15, 1969

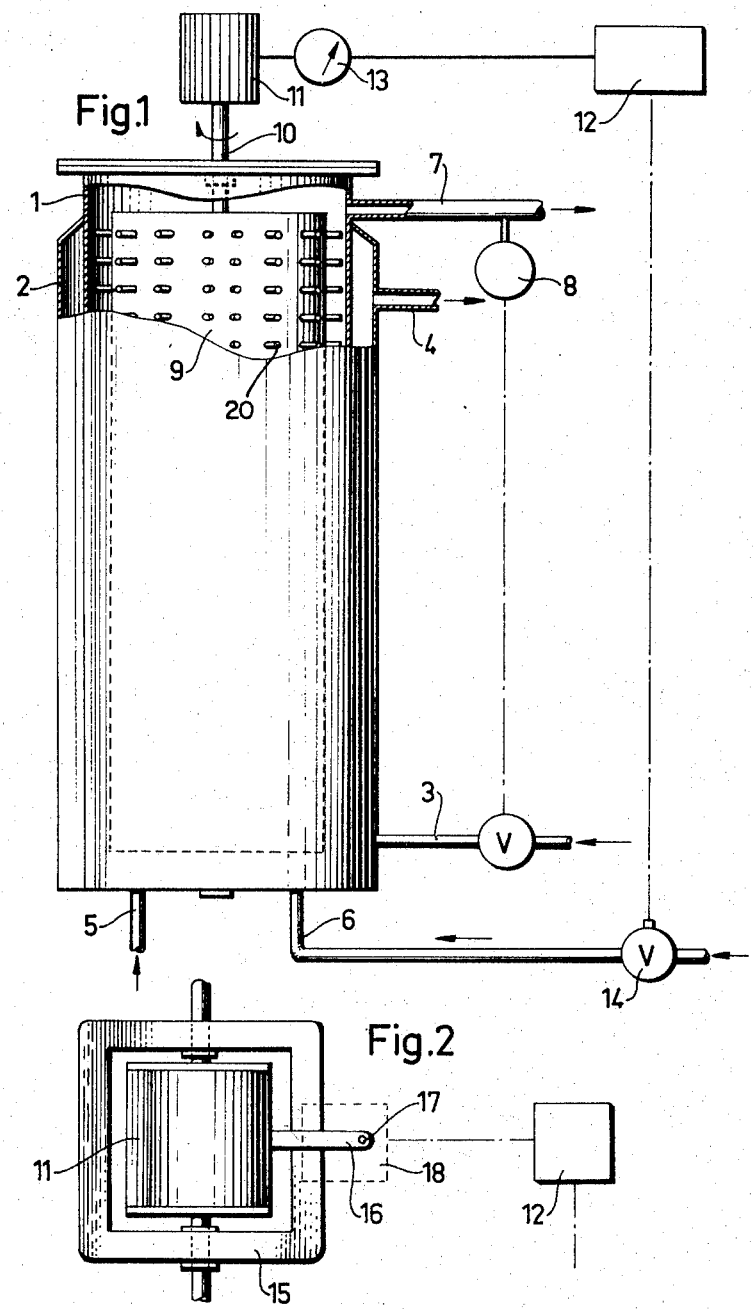

3,438,743
APPARATUS FOR SULPHONATING AND/OR SULPHATING ORGANIC COMPOUNDS CONTROLLING THE RATE OF FEED OF THE REACTANT BY MEASUREMENT OF THE VISCOSITY OF THE REACTION MIXTURE
Helmut Grunewald, Goteborg, and Olof Steijner, Stenungsund, Sweden, assignors to Mo och Domsjo Aktiebolag, Ornskoldsvik, Sweden, a corporation of Sweden
Continuation-in-part of application Ser. No. 408,624, Nov. 3, 1964. This application Feb. 1, 1965, Ser. No. 429,546
Claims priority, application Sweden, Nov. 4, 1963, 12,099/63; Feb. 4, 1964, 1,316/64
Int. Cl. B01j; C07c *143/24*
U.S. Cl. 23—285                                    7 Claims

ABSTRACT OF THE DISCLOSURE

Apparatus is provided for the controlled sulphonation and/or sulphation of organic compounds, by measurement of the viscosity of the reaction mixture, and controlling the rate of feed of the reactant according to viscosity in order to adjust the sulphonation and/or sulphation degree within the desired limits.

---

This application is a continuation-in-part of Ser. No. 408,624, filed Nov. 3, 1964.

Ser. No. 408,624 describes a process and apparatus for the continuous sulphonation and/or sulphation of organic substances with sulphur trioxide gas in an inert gaseous medium. As is stated in that application, methods for continuous sulphonation and/or sulphation of organic substances with sulphur trioxide gas as the means of sulphonation and/or sulphation in an inert gaseous medium, where the reaction mixture is led between two cooled walls which are movably arranged in relation to each other, have been proposed earlier. According to one of these use was made of a reactor consisting of a fixed, cooled stator, in which is arranged concentrically an inner, revolving, cooled rotor, the shaft of which can be horizontally or vertically mounted and the speed of which is adjustable. The space formed between the rotor and the stator in the said device is utilized as a reaction zone, the volume of the space being adjustable so that the reaction product formed remains in the reactor only for a very short time, preferably less than one minute. The reactant mixture is preferably passed concurrently with the gas mixture containing sulphur trioxide. Although the method of utilizing devices of the type described above possesses considerable advantages in comparison with discontinuous methods, it has nevertheless been found that difficulties arise in maintaining constant conditions throughout the entire course of reaction. In some cases, despite the relatively good stirring, small amounts of reaction products are obtained with high viscosity. These can adhere to the walls of the stator and give rise to discoloration of the final product. Further, in some cases an uneven degree of sulphonation of the final product may be obtained. The said disadvantages can be encountered even if a relatively high gas flow rate is maintained throughout the entire process and are particularly noticeable in the case of more difficult sulphonation and/or sulphation processes, such as, for example, sulphonation and/or sulphation of fatty alcohols and certain ethylene oxide adducts thereof.

Ser. No. 408,624 provides an apparatus which is capable of imparting a rotating, axial and lateral, turbulent movement to the reaction mixture in that the movable cooling surface is given a rotating movement and is provided with members protruding in the space between the cooling surfaces so as to attain an intensified contact between the organic liquid and the sulphonation and/or sulphation medium and which increase the turbulence of the reaction mixture, thus improving the dispersion of the sulphonation and/or sulphation medium in the organic liquid. The said members, referred to as "protruding members," are so designed that the formed reaction products are passed on towards the outlet without remaining in the vicinity of the protruding members.

Because of the rotating, axial and lateral turbulent movement, it is possible to obtain an improved dispersion of the reaction mixture in the organic substance without impeding the movement of the reaction products towards the outlet opening, whereby local oversulphonation or oversulphation accompanied by discoloration of the reaction product is entirely avoided.

Ser. No. 408,624 discloses apparatus for carrying out the continuous sulphonation and/or sulphation process according to the invention in which three suitable types of protruding members, viz. cylindrical pegs (FIG. 2), conical pegs (FIG. 3) and flat, profilated, through-going members (FIG. 4), showing their arrangement on the movable cooling surface. The arrangement as shown in FIGS. 1 and 2 is characterized by a largely cylindrical drum 1, rotatable around its axis of symmetry and cooled on the inside, which is provided on the whole or major part of its outside with a number of projecting pegs 2 to cause turbulence in the medium surrounding the members upon rotation of the drum, by a stationary, outer cooling jacket 3 which surrounds the drum concentrically, inlets 4 and 5 for the sulphur trioxide gas mixture and the organic substance 5, respectively, outlet 6 for reaction product and residual gas mixture, inlet 7 and outlet 8 for cooling of the rotating drum, and inlet 9 and outlet 10 for cooling of the cooling jacket 3 surrounding the drum.

The protruding members can be designed in many different ways, but an indispensable condition is that they are so designed and positioned on the movable cooling surface that no so-called dead zones appear in their vicinity, where reacted product can remain in the form of lumps with a higher viscosity and thereby be oversulphonated or oversulphated, resulting in discoloration of and an uneven degree of sulphonation or sulphation in the final product. This is of particular importance in the sulphonation and/or sulphation of highly viscous, organic liquids. The protruding members must thus not put up any great resistance to the flow of the reaction mixture towards the outlet. They can, for instance, be made in the form of largely cylindrical or conical pegs or pins with a largely circular cross-section, which are affixed to the movable cooling surface at an appropriate distance from one another. The height of the pegs will naturally depend on the distance between the two cooling surfaces and on the speed of the moving cooling surface in relation to the stationary cooling surface. The height should be as great as the available space between the cooling surfaces, with due regard to what is permitted by the manufacturing tolerance. In this way, the formation of poor heat-conducting layers between the stationary cooling surface and the liquid/gas dispersion is avoided and the liquid turnover is increased.

The instant invention provides an improvement on the apparatus of Ser. No. 408,624 which makes it possible to maintain the sulphonation and/or sulphation degree in each period of the process at a pre-set optimum value, controlling this automatically by a control device actuated by the resistance to be overcome by the stirrer of the stirring device.

When sulphonating and sulphating organic compounds with gaseous sulphur trioxide, it is of greatest importance to maintain the correct sulphonation and sulphation degree during the entire reaction process. The term sulphonation and/or sulphation degree is in said context to be understood as the amount of sulphur trioxide added as a percentage of the amount theoretically required for a complete sulphonation or sulphation. Usually it is operated with a sulphur trioxide excess of 2 to 8 percent, i.e. with sulphonation or sulphation degrees of 102 to 108 percent. If the sulphonation degree fails to reach the range which is the most favourable for the organic compound, an unnecessarily great amount of unsulphonated or unsulphated substance is obtained. This involves an unnecessary loss of raw material and in certain cases undesirable functional properties of the final product. If, on the other hand, the sulphonation degree is maintained at too high a value, this results in undesirable side reactions, i.e. in the form of decomposition and substantial darkening of the product. For avoiding losses and production interruptions in sulphonating and/or sulphating processes carried out on a technical scale, it is, thus, necessary for several reasons to be able to control the sulphonation degree within narrow limits. This refers particularly to continuous sulphonating or sulphating processes with reaction equipment residence times shorter than one minute where it is important to have all the time the quickest possible control of the sulphonation or sulphation degree obtained in the process in question. Heretofore, this problem was not solved in a satisfactory manner.

The present invention relates to apparatus for the sulphonation and/or sulphation of organic compounds by reaction between the organic compounds and gaseous sulphur trioxide in reaction vessels provided with stirring devices, which apparatus does not show the disadvantages of the previously known apparatus but renders it possible to maintain the sulphonation and/or sulphation degree in each period of the process at a pre-set optimum value. The apparatus is characterized in that the sulphonation and/or sulphation degree of the organic compounds is controlled automatically by a control device actuated by the resistance to be overcome by the stirrer of the stirring device for agitating the reaction mixture, said control device regulating the feeding of unsulphonated or unsulphated substance into the reaction vessel in such a manner, that a pre-set optimum sulphonation and/or sulphation degree is always obtained.

According to the invention, the resistance to be overcome by the stirrer of the stirring device for agitating the reaction mixture, thus, is utilized as an indirect measure of the sulphonation or sulphation degree.

It is previously known that for certain sulphonated organic compounds the viscosity increases with the sulphonation degree, but it is extremely surprising that this property can be used for an immediate and effective control of the sulphonation and/or sulphation degree in an industrial process, in the manner as it is carried out according to the present invention.

According to the invention, as a measure of the stirring resistance can be used the current consumed by the electric drive motor of the stirring device, which current can be measured by an ammeter. When applying the invention according to this embodiment, a transducer controlled by the current consumption of the motor is mounted in the place of the ammeter, which transducer sends to the control device a control signal in proportion to the current consumption of the motor and, thus, to the stirring resistance. In the said control device the control signal from the transducer is transformed into an output signal to the feeding device, for example a valve or metering pump, controlling the supply of unsulphonated organic substance to the reaction vessel, in such a manner, that the pre-set optimum sulphonation and/or sulphation degree is always maintained. In the event of too high a sulphonation and/or sulphation degree, thus, a greater amount of unsulphonated substance is supplied by the control device automatically and immediately until the correct sulphonation degree is achieved, while in the event of too low a sulphonation degree the supply of unsulphonated organic substance by the said control device is reduced immediately and automatically until the correct sulphonation and/or sulphation degree is achieved.

Instead of using the variations in the current consumption it is also possible to utilize the variations in the power consumption for controlling the transducer which sends the impulse to the control device. This involves the advantage that variations in the electric mains have no effect on the intensity of the output signal.

According to another, particularly advantageous embodiment of the invention the torque required for rotating the stirrer is used directly for actuating the control device controlling the feeding of unsulphonated or unsulphated substance in the aforedescribed manner.

This may, for example, be carried out such, that the drive motor is suspended movably in a fixed bracket. A momentum lever mounted on the motor actuates a transducer in the form of a pressure gauge, the measuring result of which is transformed, for example, into a pneumatic output signal being proportional to the size of the momentum and, thus, also to the sulphonation and/or sulphation degree. The output signal obtained is made an input signal in a control device, for example a PID-regulator, sending a control signal to the feeding device of the organic substance.

The apparatus according to the invention is adapted for use both in continuous and intermittent sulphonation and/or sulphation reactions. In the latter case, the apparatus may be applied for indicating the final reaction point in every type of apparatus provided with stirring means.

Before starting the technical operation the control device is calibrated for the organic substance in question, in such a manner, that the current intensity, power or torque required by the stirring device is determined at a suitable temperature for different sulphonation and/or sulphation degrees, whereafter the control device is adjusted for making suitable corrections of its output signal when the determined "reference" value, i.e. the suitable sulphonation and/or sulphation degree is exceeded or failed to be reached. When the output signal of the control device is varied, also the feeding by the feeding device is subjected to alteration. The reaction temperature is maintained constant by a temperature regulator controlling the supply of cooling water to the reactor jacket. The pressure required for propelling the sulphonation gas mixture can be effected either by vacuum applied at the outlet end or by overpressure at the inlet end of the reaction vessel.

The present invention relates to an apparatus which is particularly adapted for carrying out the aforesaid process. Said apparatus is shown in FIG. 1 and comprises a substantially cylindrical closed reaction vessel or stator 1 provided with a cooling jacket 2 having inlet and outlet 3 and 4 for the cooling water, inlet 5 for the sulphur trioxide mixture, inlet 6 for the substance to be sulphonated and/or sulphated, outlet 7 for the mixture of sulphonated and/or sulphated product and residual gas, and a temperature control device 8 connected to the outlet 7 and cooling water inlet 3. A substantially cylindrical, cooled, rotary stirrer or rotor 9 is mounted concentrically in said reaction vessel, the stirrer shaft 10 located outside of said vessel being connected with an electric drive motor 11. Affixed around the cylindrical rotor 9 are pegs 20, of the appearance shown in FIGURE 1 of the drawing. The space between the rotor 9 and the stator 1 serves as the reaction zone, and the ends of the pegs extend almost to the stator wall 1, so that they thoroughly and uniformly agitate the reaction mixture in the reaction zone, without obstructing flow of the reaction mixture from the inlet towards the outlet. The apparatus is characterized in that a control device 12 connected to the shaft 10 or drive motor 11 and actuated by the resistance to be overcome by the stirrer 9 for agitating the reaction mixture, controls the feeding through inlet 6 of the substance to be sulphonated and/or sulphated in such a manner, that the pre-set optimum sulphonation and/or sulphation degree is always obtained. FIG. 1 shows the case when the current intensity or power demand of the drive motor is used to be recorded by the transducer 13 which sends an impulse in proportion to the current intensity and power demand of the motor to the control device 12. The transducer 13 may, for example, be an ammeter combined with a member sending an output signal to the control device 12, said signal being, for example, of electrical or pneumatical nature and proportional to the current consumption.

The control device 12 comprises a regulator for sending an output signal which corresponds to the incoming signal, to the size thereof as well as to the rate of change in the intensity of the signal. The said regulator may be given proportional and/or derivating and/or integrating function, according to the regulation desired. A suitable regulator is a so-called PID-regulator which can be used with some or all of the said functions and which sends a pneumatic output signal. Another suitable control device is, for example, a regulator of the Källe type which transforms the electric output signal arriving from the transducer 13 into mechanical movement. It is, of course, also possible to transform in the control device 12 the signal from the transducer 13 into an electric output signal, for example in a PID-regulator with electric output signal.

The signal from the transducer 13 actuates through the control device 12 the feeding device 14 which adjusts the flow of unsulphonated substance through the inlet 6. Said feeding device may, for example, be a valve, such as an electrically, electrohydraulically or pneumatically controlled regulating valve, or a metering pump, for example a piston metering pump with pneumatically or electrically controlled stroke length, or a gear pump or screw pump driven by a pneumatically or electrically controlled change speed gear.

When applying the apparatus, determination is first made of the desired feeding amount of organic substance—for example the position of the feeding valve—required for achieving the desired sulphonation degree, and at the same time the intensity of the output signal from the transducer 13 is determined. Thereafter the control device 12 is adjusted to feed at this intensity of the output signal from the transducer 13 always the correct amount of organic substance. When a signal given by the transducer 13 surpasses in strength the "reference" value set in the control device 12, i.e. when the desired sulphonation degree is exceeded, the control device 12 sends a stronger output signal to the feeding device 14, thereby increasing the feeding amount—for example enlarging the opening of the feeding valve. In the event of decreasing strength of the output signal from the transducer 13, corresponding corrections are made for reducing the feed amount of organic substance.

According to another expedient embodiment of the apparatus, the torque required for effecting the rotation of the stirrer at a suitable number of revolutions for the sulphonation and/or sulphation is used directly for controlling the feeding of unsulphonated substance via the control device 12. An arrangement of this type is shown by way of example in FIG. 2, in which arrangement the electric drive motor 11 operating at a constant number of revolutions is suspended movably in a fixed bracket 15. A momentum lever 16 attached to the motor abuts to the stop 17 on the indicating pressure gauge 18, the said stop being mounted on said bracket, and said pressure gauge being connected with the control device 12. As a pressure gauge may suitably be used a so-called differential pressure gauge which transforms the recorded pressure into a pneumatic or electric output signal. Other applicable pressure gauges are, for example, wire strain gauges transforming the recorded pressure into an electric output signal. The apparatus operates in principle in the same way as the afore-described apparatus, i.e. the output signal outgoing from the pressure gauge and being proportional to the pressure caused by the torque, actuates the control device 12 which, in turn, controls the feeding of unsulphonated substance to the reaction vessel.

The invention is illustrated by the following examples.

Example 1

Into a continuously operating sulphonation reactor of the type shown in FIG. 1 were simultaneously fed through separate inlets a stream of dodecyl benzene and a sulphur trioxide-air mixture comprising 6 percent by volume of sulphur trioxide. The introduction of the sulphur trioxide mixture was effected by applying at the outlet end a vacuum of about 380 mm. Hg. The temperature in the reactor was maintained constant at 35° C. by the temperature regulator controlling the supply of cooling water to the cooling jacket of the reactor. The cylindrical stirrer was driven by a 10 H.P. electric motor at a constant speed of 370 r.p.m. The supply of unsulphonated substance was varied so that different sulphonation degrees were obtained. The sulphonation degree of the product discharged was determined by titration with 0.1 N NaOH. The current consumption for each sulphonation degree was measured, the relationship between the sulphonation degree and the current consumption being as follows:

| Sulphonation degree, percent | Current consumption, amperes |
|---|---|
| 100 | 8.22 |
| 101 | 8.25 |
| 102 | 8.32 |
| 103 | 8.40 |
| 104 | 8.55 |
| 105 | 8.73 |
| 106 | 8.95 |

The ammeter inserted was replaced by a transducer which transformed the recorded current into a proportional pneumatic output signal of the intensity 3 to 15 p.s.i. This signal was fed to a control device of the PID-type (Honeywell) the reference value of which was set at an output signal from the transducer corresponding to 8.73 amperes and at a feed of unsulphonated substance corresponding to a sulphonation degree of 105%. Thereafter 5000 kg. of dodecyl benzene were introduced and sulphonated continuously.

Samples taken from the product obtained showed a uniform sulphonation degree of 104 to 106% and a colour of 1 Gardner determined in a 15% solution.

Example 2

A reaction equipment of the type, in principle, as shown in FIG. 1 was provided with a transducer of the differential pressure gauge type with a pneumatical output signal of 3 to 15 p.s.i. for recording the torque, and a control device of the PID-regulator type as shown in FIG. 2. For determinating the "reference" value on the PID-regulator corresponding to a sulphation degree of 104%, a reaction product was introduced into the reactor in varying amounts per time unit, which reaction product was obtained by reacting 1 mole of lauryl alcohol with 3 moles of ethylene oxide at a reaction temperature of 25° C. A 6% sulphur trioxide-air mixture was introduced by applying an overpressure of 0.1 kg. at the inlet end of the reaction vessel. At the same time dry air was introduced through a separate opening in an amount equivalent to the SO$_3$-gas mixture. The sulphation degree obtained was determined by titrating samples taken from the effluent reaction product with 0.1 N NaOH. At the same time reading was made of the intensity of the output signal from the differential pressure gauge, which intensity was recorded on the PID-regulator diagram. Hereby it was found that the sulphation degree of 104% was obtained at an intensity of 13 p.s.i. of the signal from the differential pressure gauge. The "reference" value of the PID-regulator was adjusted accordingly whereafter 2000 kg. of the aforesaid lauryl alcohol ethylene oxide adduct were introduced into the reactor at a rate of 170 kg. per hour. The sulphation was completed in 12 hours, whereafter the sulphated product was neutralized with 5% NaOH solution to form a solution containing 28% of active material determined by Epton titration. The product obtained showed a salt content of 0.65%, a content of unsulphonated substance of 1.1% and a colour below 1 Gardner.

The process and apparatus according to the invention render it possible to sulphonate and/or sulphate organic compounds on an industrial scale to products of extremely high quality in an economic and effective manner. The invention is of particular advantage in the continuous sulphonation and/or sulphation of substances which are difficult to sulphonate and/or sulphate, such as fatty alcohols, fatty alcohol polyglycol ethers, nonylphenol, polyglycol ethers, straight chain alkyl benzenes, fatty acids and fat oils, but may also be applied with excellent result in the sulphonation and/or sulphation of, for example, dodecyl benzene, tetrapropylene benzene, toluene as well as of mixtures of said products.

We claim:

1. Apparatus for the controlled sulphonation and/or sulphation of liquid organic compounds with a stoichiometric excess of sulphur trioxide-inert gas mixture, capable of maintaining the sulphonation and/or sulphation degree within predetermined limits according to the viscosity of the reaction mixture, and thus producing a light-colored sulphonated and/or sulphated product, having a low salt content, after neutralization, and a low proportion of unsulphonated and/or unsulphated material, comprising, in combination, a substantially cylindrical stator; a substantially cylindrical rotor, concentrically and rotatably mounted within the stator, spaced from the inner wall thereof, and defining an annular reaction zone therebetween within which can be disposed a sulphonation and/or sulphation reaction mixture; means for rotating the rotor; means disposed within the rotor for cooling the rotor surface; a stationary outer cooling means surrounding the stator; means for circulating a cooling fluid through each cooling means; and means for controlling the temperature of the cooling fluids to maintain a reaction mixture within the reaction zone at a reaction temperature; and a plurality of projecting members disposed on the outer surface of the rotor, so designed and positioned thereon that when the rotor is rotated, the protruding members uniformly agitate a reaction mixture disposed in the reaction zone, with substantially no dead zones therein; an inlet for the introduction of organic substance to be sulphonated and/or sulphated to the reaction zone; an inlet spaced therefrom for the introduction of sulfur trioxide-inert gas mixture into the same zone; and an outlet for the withdrawal of unreacted gases and reaction mixture from the said zone; an electric drive motor for operating the rotor-rotating means; measuring means connected to the rotor for measuring the resistance to the operation of the rotor by the electric motor, afforded by a reaction mixture in the reaction zone, according to the viscosity of the mixture, and arranged to give a signal correlated to such viscosity; and control means responsive to signals from the measuring means within a predetermined range, correlated to a predetermined range of viscosities of a reaction mixture within the reaction zone, to control the rate of reactant feed entering the reaction zone via either or both of the inlets for sulfur trioxide-inert gas mixture and organic material to be sulphonated and/or sulphated; thereby to control the sulphonation and/or sulphation degree of the reaction mixture within a predetermined range according to the signals actuating the control means.

2. Apparatus according to claim 1 comprising a measuring means which measures the current consumed by the electric drive motor, according to the viscosity of the reaction mixture, and a transducer actuated by a predetermined range of current consumption of the motor and operatively connected to the control means, sending to the control means a control signal correlated within a predetermined range to the current consumption of the motor, and thus to the viscosity of the reaction mixture.

3. Apparatus in accordance with claim 2 in which the current consumed by the electric drive motor is measured by an ammeter.

4. Apparatus according to claim 2 in which the control means actuates a valve or metering pump, controlling the supply of unsulphonated or unsulphated organic material and/or sulfur-trioxide inert gas mixture to the reaction zone, in a proportion to maintain a predetermined sulphonation and/or sulphation degree in the reaction mixture.

5. Apparatus according to claim 1 in which the measuring means measures the power consumption of the electric drive motor for the rotor.

6. Apparatus according to claim 1 in which the measuring means measures the torque required for operating the rotor.

7. Apparatus according to claim 1 adapted for continuous operation in the sulphonation and/or sulphation reaction, with reactants continuously introduced through the inlets, and reaction products and unreacted gases continuously withdrawn through the outlet.

References Cited

UNITED STATES PATENTS

| | | | |
|---|---|---|---|
| 2,665,197 | 1/1954 | Rowland | 23—285 |
| 2,904,401 | 9/1959 | Booth | 137—92 |
| 2,974,017 | 3/1961 | Morgan | 23—285 |
| 3,158,632 | 11/1964 | Blaser et al. | 260—286 |
| 3,198,849 | 8/1965 | Ballestra | 260—686 |
| 3,350,428 | 11/1967 | Brooks et al. | 260—400 |

JAMES H. TAYMAN, JR., *Primary Examiner.*

U.S. Cl. X.R

23—260; 137—4, 92, 467.5; 260—505, 686, 698